US010887358B2

(12) United States Patent
Yu et al.

(10) Patent No.: US 10,887,358 B2
(45) Date of Patent: Jan. 5, 2021

(54) METHOD AND SYSTEM FOR PROVIDING RECOMMENDATIONS USING LOCATION INFORMATION

(71) Applicant: PortAura Group, Union City, CA (US)

(72) Inventors: Jin Yu, Union City, CA (US); Xunhui Yu, North Wales, PA (US); Jia Wen, Chengdu (CN)

(73) Assignee: PORTAURA GROUP, Union City, CA (US)

(*) Notice: Subject to any disclaimer, the term of this patent is extended or adjusted under 35 U.S.C. 154(b) by 0 days.

(21) Appl. No.: 15/445,893

(22) Filed: Feb. 28, 2017

(65) Prior Publication Data
US 2017/0171324 A1 Jun. 15, 2017

Related U.S. Application Data

(63) Continuation of application No. 13/776,715, filed on Feb. 26, 2013, now Pat. No. 9,621,600.

(51) Int. Cl.
| | |
|---|---|
| G06F 15/16 | (2006.01) |
| H04L 29/06 | (2006.01) |
| H04W 4/21 | (2018.01) |
| H04W 4/029 | (2018.01) |
| H04L 29/08 | (2006.01) |
| G06Q 30/02 | (2012.01) |
| G06Q 50/00 | (2012.01) |

(52) U.S. Cl.
CPC ........... *H04L 65/403* (2013.01); *G06Q 30/02* (2013.01); *G06Q 50/01* (2013.01); *H04L 67/18* (2013.01); *H04L 67/2842* (2013.01); *H04L 67/306* (2013.01); *H04W 4/029* (2018.02); *H04W 4/21* (2018.02)

(58) Field of Classification Search
CPC . H04L 67/2842; H04L 67/306; H04L 65/403; H04W 4/02
USPC ................................ 709/204, 206, 217, 219
See application file for complete search history.

(56) References Cited

U.S. PATENT DOCUMENTS

| | | | | |
|---|---|---|---|---|
| 8,250,096 | B2 * | 8/2012 | Su ..................... | G06F 17/30867 705/35 |
| 8,583,823 | B2 * | 11/2013 | Blewett ............... | H04L 67/1002 709/220 |
| 9,135,364 | B1 * | 9/2015 | Sundaram ......... | G06F 17/30902 |
| 2004/0162830 | A1 * | 8/2004 | Shirwadkar ......... | G06F 17/3087 |
| 2011/0196901 | A1 * | 8/2011 | Kesselman ....... | G06F 17/30336 707/813 |

(Continued)

*Primary Examiner* — Kaylee J Huang
(74) *Attorney, Agent, or Firm* — Kilpatrick Townsend & Stockton, LLP

(57) ABSTRACT

The present invention is directed to system and method for providing recommendation to users using location information. In various embodiments, the present invention provides system that integrates information from user profiles and user-generated content, which can be obtained from a number of social networks, and merchants, to generate recommendations using location information in conjunction with the context of user profiles from various data sources and/or social networks. In certain embodiments, user generated-contents, user profiles and relationships thereof are collected, integrated, analyzed, and stored to allow them to be useful and usable in making recommendations. There are other embodiments as well.

15 Claims, 5 Drawing Sheets

(56) References Cited

U.S. PATENT DOCUMENTS

| | | | |
|---|---|---|---|
| 2012/0233238 A1* | 9/2012 | Braginsky | G06Q 30/0261 709/203 |
| 2013/0036165 A1* | 2/2013 | Tseng | G06Q 30/02 709/204 |
| 2013/0066821 A1* | 3/2013 | Moore | G06Q 30/0259 706/46 |
| 2013/0073686 A1* | 3/2013 | Sandholm | G06F 17/3087 709/219 |
| 2016/0004410 A1* | 1/2016 | Srinivasan | G06Q 50/01 715/765 |

* cited by examiner

METHOD AND SYSTEM FOR PROVIDING RECOMMENDATIONS USING LOCATION INFORMATION

CROSS REFERENCE OF RELATED APPLICATION

This application is the continuation of U.S. patent application Ser. No. 13/776,715, entitled "METHOD AND SYSTEM FOR PROVIDING RECOMMENDATIONS USING LOCATION INFORMATION", filed with the USPTO on Feb. 26, 2013, which is incorporated herein by reference in its entirety.

BACKGROUND OF THE INVENTION

The present invention is directed to system and method for providing recommendation to users using location information.

With the advent of the Internet and social network, people are used to share information and receiving time and location sensitive information and recommendations. For example, social networks such as Facebook and Google+ now utilize location information to make information sharing relevant. Similarly, location sensitive information can be vastly valuable to merchants, as merchants can benefit and profit from pushing out context-sensitive information to potential customers who are near their business locations.

Unfortunately, existing techniques have been inadequate, as explained below. Therefore, it is desirable to have new and improved techniques for providing recommendations.

BRIEF SUMMARY OF THE INVENTION

The present invention is directed to system and method for providing recommendation to users using location information. In various embodiments, the present invention provides system that integrates information from user profiles, which can be obtained from a number of social networks, and merchants, to generate recommendations using location information in conjunction with the context of user profiles from various data sources and/or social networks. In certain embodiments, user profiles and relationships thereof are collected, integrated, analyzed, and stored to allow them to be useful and usable in making recommendations. There are other embodiments as well.

DETAILED DESCRIPTION OF THE INVENTION

Figure 1:
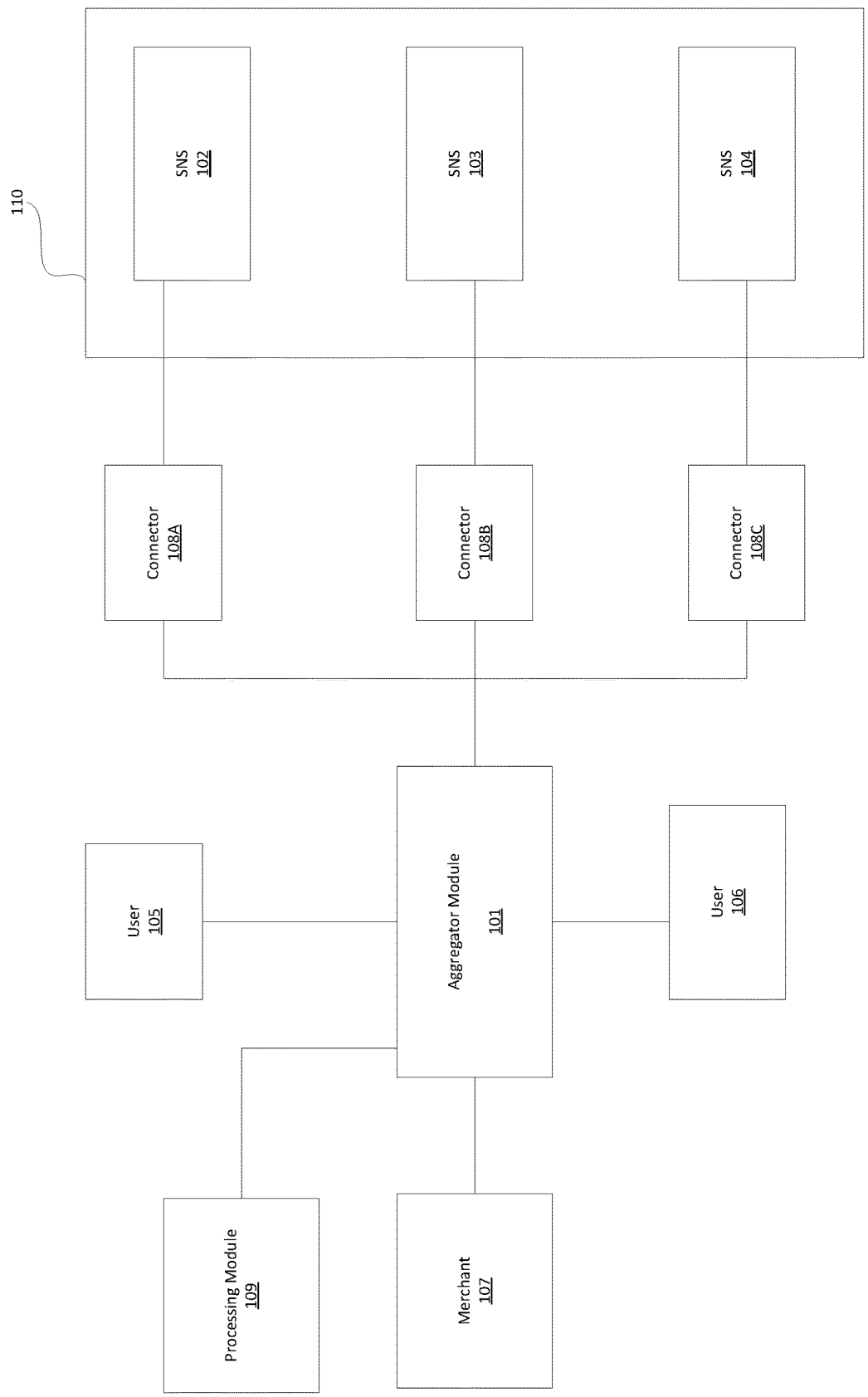
FIG. 1 is a simplified diagram illustrating an aggregator architecture according to embodiments of the present invention.

The present invention is directed to system and method for providing recommendation to users using location information. In various embodiments, the present invention provides system that integrates information from merchants and user profiles and user-generated contents, which can be obtained from a number of social networks, to generate recommendations using location information in conjunction with the context of user profiles from various data sources and/or social networks. In certain embodiments, user profiles and relationships thereof are collected, integrated, analyzed, and stored to allow them to be useful and usable in making recommendations. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

In various embodiments, social network data are collected through a data discovery and analysis process, where the following processes are performed:
 Geo-location based social aggregation and discovery
 Caching in social data warehouse
 Analysis and social relevance determination In the geo-location based social aggregation and discovery process, user profiles and location-based information are collected from various sources. Depending on the application, a user profile may include, in addition to basic user information, user generated contents, such as blog, reviews, preferences, and/or others. For example, a user may, through a mobile app installed on a mobile device, authorize data collection, through which her social network information, contacts, preference, location, and/or other types of information are collected. A user may use a mobile app to share her location (e.g., Facebook check-in, Foursquare check-in). This user may be connected to more than one social networks, and information from different social networks and the relevant contacts thereof are obtained from these social networks. For example, a user on Facebook may have various interests that are shared with her friends.

Consumers with these interests that may be relevant to merchants are discovered and aggregated.

Once user data are obtained, they are stored and/or cached in a social data warehouse. In an embodiment, user data are stored at three cache levels, which allow for performance, scalability, and flexibility. At the first level, data is stored at a main memory, which is fast. At the second level, data are stored at a memory cache. At the third level, data are stored at a hard disk based storage. Depending on the application, what kind of data stored at where can be customized.

The stored user data are analyzed and their social relevance thereof is determined. To provide an example, various types of data analysis are described below.

Social aggregation and discovery processes are performed with the help of location information. Depending on the application, one or more types of social networking services are connected, from which relevant information is retrieved. For example, it is possible to obtain user profiles from different types of social networking services, which can be:

Friend-based content portals, which are content-driven sites with close friend-based networks. Most content can only be accessed by friends. Examples include Facebook and Renren.

Micro-blogs, which are open social portals with each message limited to 140 characters in size. These services are very open, with majority of the content viewable by the public. Examples include Twitter, Sina Weibo, and Tencent Weibo.

Location-based services, which are services focused on POIs check-ins and comments.

Examples include Foursquare and Jiepang.

Image sharing services, which host user-uploaded images and allows sharing among friends and the public. Examples include Instagram and Flickr.

Various embodiments of the present invention leverage public access (Application Programming Interfaces) APIs from these social networking services to retrieve geo-tagged content elements. For example, when a user uploads a piece of content to a social networking service via her smartphone, she may choose to attach the current GPS coordinates (e.g., latitude/longitude) from her phone, signifying that the content is created at that location. This can be applied to both textual and graphical contents. For example, the user may upload a photo to Facebook, where the photo is tagged with GPS coordinates for the location of photo taken. In another example, when the user visits a coffee shop, she may check into this coffee shop with Foursquare, along with the GPS coordinates of the coffee shop.

The location information and social network information are aggregated. More specifically, collecting data from these social networks is achieved through an aggregation module, which can be referred to as the Aggregator. The Aggregator retrieves social data through a connecting module, which can be referred to as Connectors. For example, each connector is responsible for interfacing with a single social network. In an embodiment, a connector can be configured to communicate appropriate social network to perform the following functionalities:

Given a GPS coordinates, retrieve a list of nearby social user within a given radius Given a GPS coordinates, retrieve a list of nearby POI (point of interests) within a given radius Given a GPS coordinates, retrieve a list of content elements (e.g., tweets, photos) generated by users nearby Given a GPS coordinates, retrieve a list of content elements (e.g., coupons, events) generated by businesses nearby Retrieve a user's public-accessible profile (e.g., name, city/state, birthday, interests)

Retrieve a user's public-accessible content elements (e.g., tweets, photos)

Retrieve a user's friend, favorite, follower lists

Posting content on behave of a user (e.g., tweets, photos, comments)

Retrieve content from a POI (e.g., coupons, events)

The aggregator architecture is extensible, which makes adding additional data sources easy. To provide an example, to support a new data source (i.e., a new social network), a new connector for that data source can be added.

FIG. 1 is a simplified diagram illustrating an aggregator architecture according to embodiments of the present invention. This diagram is merely an example, which should not unduly limit the scope of the claims herein. One of ordinary skill in the art would recognize other variations, modifications, and alternatives. As shown in FIG. 1, a aggregator module 101 is connected to data sources 110. Depending on the application, data sources 110 may include various types of social networks services (SNS) and/or other type of network services. As shown, data sources 110 include SNS 102, SNS 103, and SNS 104. For example, SNS can be social networks such as Facebook, Google+, Twitter, Foursquare, and/or others. A large number of users is connected to these SNS. For example, user 106 is a member of SNS 102 and 103, while user 105 is a member of SNS 103 and 104, and their user profiles are stored at the respective SNS. The aggregator module 101 is a part of an aggregation system and connected to data sources 110, which includes various SNS. The aggregator module 101 is configured to retrieve relevant information from data sources 110 as needed, which is described below. For example, the aggregator module 101 is connected to data sources 110 through various type of data communication networks, such as the Internet, optical communication network, mobile, communication network, and/or others.

Users, in addition to being members of various SNS, are connected to the aggregator module 101. For example, users 105 and 106 are connected to the aggregator module through one or more communication interface and/or gateways (now shown in FIG. 1, but shown, as an example, in FIG. 2). In certain embodiments, user devices such as mobile phones are installed with an application that connects to the aggregator module 101. For example, the application can be a mobile application referred to as "MyShine." As an example, both users 105 and 106 have MyShine installed on their mobile devices, through which they send location and/or other information to the aggregator module 101. In response to information received from the users, the aggregator module 101 obtains information associated with users 105 and 106 from their perspective networks. The aggregator module 101 is connected to connector modules 108A, 108B, and 108C. As shown, the connector module 108A is connected to SNS 102; the connector module 108B is connected to SNS 103; the connector module 108C is connected to SNS 104. For example, the connector modules are specifically configured to interface between SNS and the aggregator module 101. In various embodiments, the connector modules obtains information from SNS using user credentials (e.g., user credentials supplied by "MyShine" users). For example, users 105 and 106 may be registered users for one or more of the SNS 102, 103, and 104. The aggregator module 101, depending on the application, can obtain permissions from users to access their perspective user information stored at their SNS, and the connector modules use the user information to access the respective SNS. For example, users 101 and 106 are MyShine users, and they access social network information through aggregator module 101, which utilizes connector modules to access various social networks. Users 101 and 106, through the aggregation system, may receive additional information from the SNS that are relevant. For example, based on the location information of user 101, the aggregator system may retrieve information of one or more users (who may or may not be "friends" of users 101) of SNS 102 who are within a proximity of the user 101. It is to be appreciated that relevant information to a user can help discover new contacts and provide other location sensitive information.

The aggregator module 101, as a part of an aggregation system, can be access by both users and merchants. For example, users may receive recommendation and/or other useful and location sensitive information from generated by processor module 109, and the information can be obtained by the aggregator module 101. In addition, merchants can access the aggregator module 101 as well. For example, merchants access the aggregator module 101 through communication interface and/or communication gateway. As shown in FIG. 1, merchant 107 is connected to the aggregator module 101. Since merchants may use information differently from users, merchants can access the aggregator module 101 in different ways. For example, the merchant 107 may access location sensitive and up to date information from the aggregator module 101 through web pages, mobile applications, and/or others. As an example, the merchant 107 may request an update from the aggregator module 101 from time to time related to customers. The aggregator module 101 may access or otherwise perform actions on behalf of users and/or merchants in response to (1) requests from users and/or merchants; or (2) a detection of an update of location and/or other information by the users and/or merchants.

Figure 2:
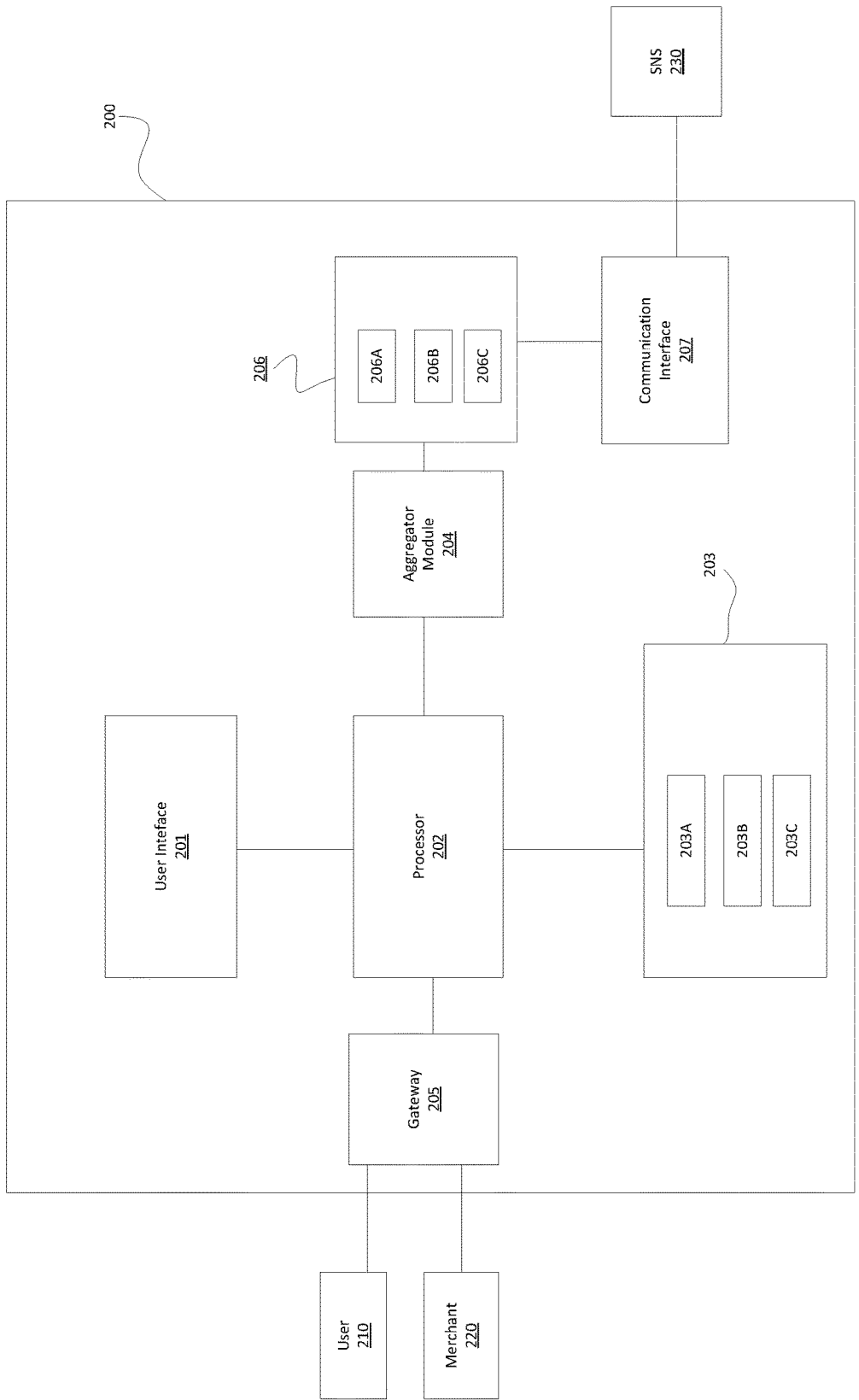
FIG. 2 is a simplified diagram illustrating a social data warehouse architecture 200 according to embodiments of the present invention.

FIG. 2 is a simplified diagram illustrating a social data warehouse architecture 200 according to embodiments of the present invention. This diagram is merely an example, which should not unduly limit the scope of the claims herein. One of ordinary skill in the art would recognize other variations, modifications, and alternatives. The social data warehouse architecture 200 comprises a user interface module 201, a processor module 202, a storage module 203, aggregator module 204, gateway module 205, connector module 206, and a communication interface module 207. Depending on the application, the social data warehouse architecture 200 may have additional components as well. In certain embodiment, the processor 202 is implemented using general purpose computer(s). The processor module 202 is configured to perform instructions stored in machine-readable mediums, such as hard drive, solid state memory, read-only memory, and/or others. For example, the instructions can be stored at the storage module 203. The processor module 202, executing machine instructions, can perform various tasks described in various parts of this application, such as obtaining user information and determining recommendations. In a specific embodiment, the processing module 202 is implemented as "AuraMesh", a part of a social networking application architecture. As shown in FIG. 2, user 210 and the merchant 220 sends information to the processor 202 through the gateway 205. User information is obtained from the user 210 through the gateway 205 and processed by the processor module 202. For example, the user 210 changes her location, which results in her mobile device sending a location update to the processor 202 through the gateway 205. The processor 202 processes the information update and uses the aggregator module 204 to access SNS 230. The aggregator module 204 is connected to one or more connector modules 206 (for example, connector modules 206A, 206B, and 206C). As explained above, the connector module 206 is configured to access one or more SNS 230. The communication interface 207 provides connector modules 206 access to SNS 230. For example, the communication interface 207 Internet through WLAN, wireless network, and/or other types of communication networks.

The storage module 203 is configured to store various types of information. For example, the storage module 203 can be configured to store computer executable instruction. In addition, the storage module 203 can be used to store cached information. In certain embodiments, the storage module 203 is configured as cache memory with multiple levels of storage type and implemented using different types of storage mediums. For example, the storage module 203 may have three level of storage: storage 203A as level 1 storage, storage 203B as level 2 storage, the storage 203C as level 3 storage. The access speed, access frequency, and storage size vary at each level, and different storages are configured to storage different type of data, as explained below. The user interface 201 provides input/output, through which users can interact with the processor module 202. For example, the user interface 201 includes display and input devices, thereby allowing users to change settings related to making recommendations.

Unlike conventional web sites, which support web crawlers from search engines such as Google and Yahoo, social networks do not allow web crawlers or robots to mine their content.

This is because a social network contains a huge amount of inter-related information elements, and there is no established methodology to efficiently mining them. Therefore, it is to be appreciated that the aggregator system according to embodiments of the present invention does not utilize traditional crawling strategy. Instead, it operates on a real time, on-demand basis.

The social data warehouse (for example, shown in FIG. 2) works for both consumers and businesses. To make information context sensitive and relevant, GPS information is used. For example, GPS information refers in general to location services, which include satellite-based location, cellular tower triangulation, and/or WIFI hotspot. For consumers, a backend social aggregation service according to various embodiments of the present invention works in conjunction with a social app. In a specific embodiment, the social app is a specially designed application that operates on mobile devices called "MyShine." As an example, functions of Myshine are described below:

1. MyShine activates the GPS functionality (e.g., with the user's consent) on a smartphone to obtain the current GPS coordinates.

2. A social aggregation service module leverages public access APIs from major social networking services to search for geo-tagged content elements around the current location and then organizes the result into one or more of the following categories:

Social users nearby
Textual content created by users around this location
Graphical content created by users around this location
Point of interests (POIs) nearby
User check-ins at nearby POIs
User comments for nearby POIs
Events at nearby POIs
Coupons/promotional items at nearby POIs 3. The content can be further sorted and filtered according to the following criteria:
Distance of the content
Creation time of the content
Sex of social users
Keyword filters For business users (e.g., B&M businesses), a merchant portal is provided and used with the social aggregation services. For example, the merchant portal can be AuraPortal, with our backend social aggregation service:

1. AuraPortal locates the GPS coordinates of the B&M business' storefront.

2. A social aggregation service leverages public access APIs from major social networking services to search for geo-tagged content elements around the storefront location and then organize the result into one or more of the following categories:
Social users nearby
Textual content created by users around this location
Graphical content created by users around this location
User check-ins at nearby POIs
User comments for nearby POIs 3. The content can be further sorted and filtered according to the following criteria:
a. Distance of the content (e.g., a person 500 m from the storefront)
b. Creation time of the content (e.g., a person was around this area 10 minutes ago)
c. Sex of social users
d. User's interests
e. User's influence (i.e., the number of people following this user)

It is to be appreciated that the aggregation service can be triggered by users (e.g., MyShine users) or merchants. In response to location updates from users or requests from merchants (or other actions or activities), the aggregation service retrieves relevant geo-tagged information elements from various social networks.

In various embodiments, the aggregated data is stored in a cloud-based social data warehouse. For example, specialized data warehouse is configured and referred to as AuraMesh.

Note that data aggregation happens on demand, based on actions performed by end users and merchants. As a result, the storage media is used very efficiently—only the content needed by end users and merchants are retrieved and stored in the data warehouse.

Through users and contacts thereof, a large set of data can be collected. For example, through MyShine users and AuraPortal merchants, the data aggregate service retrieves nearby social users and the content elements generated by them. From these social users, information related to their friends, favorite persons, and potentially nearby users, can be retrieved.

Figure 3A:
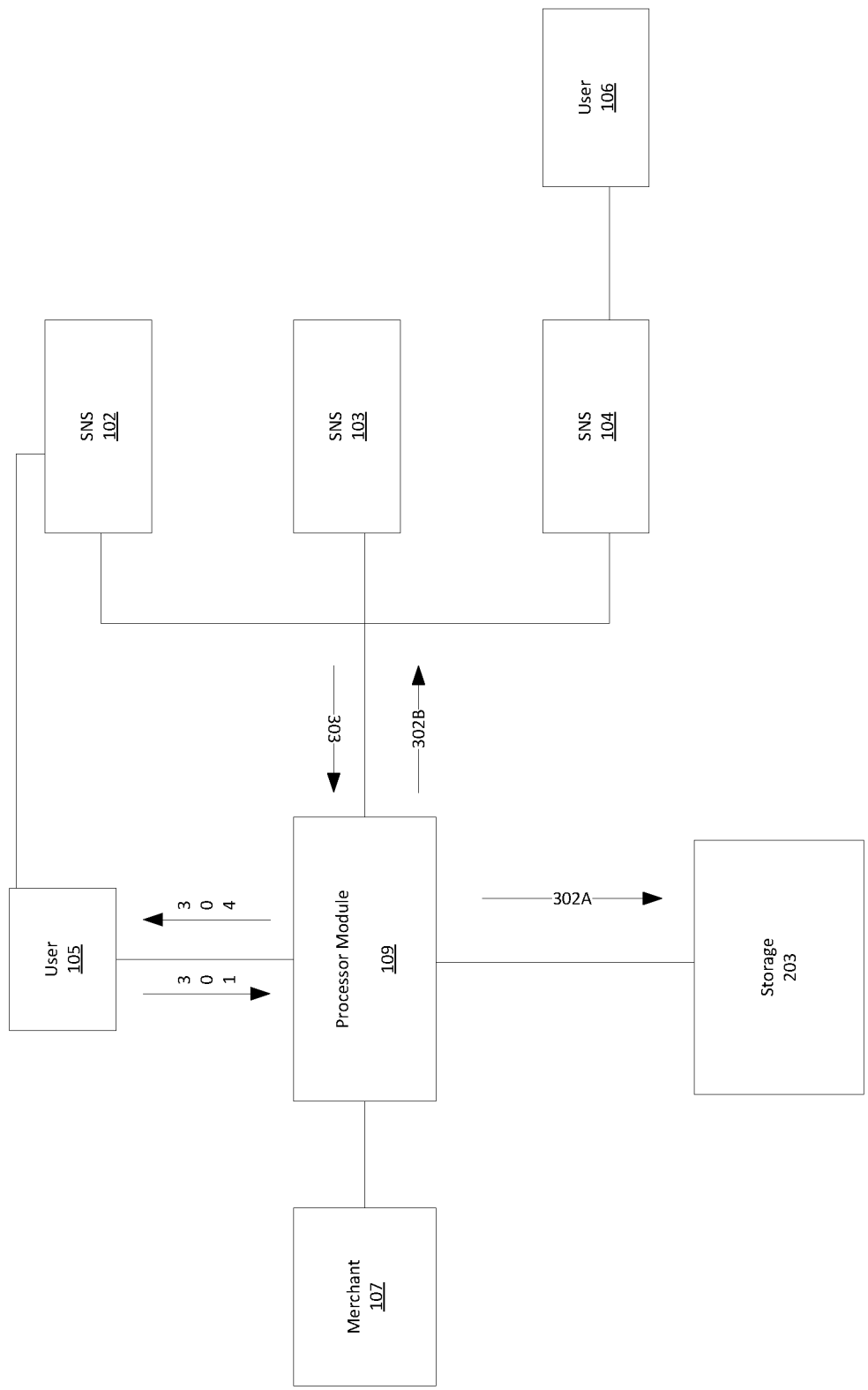
FIG. 3A is a simplified diagram illustrating a process for retrieving data according to embodiments of the present invention.

FIG. 3A is a simplified diagram illustrating a process for retrieving data according to embodiments of the present invention. This diagram is merely an example, which should not unduly limit the scope of the claims herein. One of ordinary skill in the art would recognize other variations, modifications, and alternatives. For example, FIG. 3A illustrates obtaining data in response to a user input, which can be location update, user request, or other triggering mechanism. Various steps illustrated in FIG. 3A can be added, removed, modified, re-arranged, repeated, replaced, and/or overlapped.

At step 301, the user 105 transmits a location update to the processor module 109. For example, the processor module 109 is implemented as an AuraMesh module. For example, the location update can be an automatic location update generated by the mobile device of the user 105 when the user changes from one location to another. The location update can also be a part of a user request. For example, the user 105, upon entering into a new location, wants to find out what is interesting around the area, and to do so, the user 105 uses a mobile application to send the request that embeds the location update to the processor module 109. It is to be appreciated that the location update can be in other forms as well.

Once the a processor module 109 receives the location update, it processes the location update. The processor module 109 identifies user 105 and her location. Based on the user profile of the user 105 and her location, the processor module 109 determines whether information to be used for this location update has been previously retrieved within a predetermined time period. For example, if information needed to serve the user 105 is stored at the storage 203 within a predetermined time period (e.g., 5 minutes, 10 minutes, or other predetermined time period), processor module 109 obtain the information from the storage 203, at step 302A. On the other hand, if the information is not available at the storage 203, which can be unavailable or outdated according to the predetermined time period, the processor module 109 requests for the information from the SNS, at step 302B. In various embodiments, the processor module 109 access SNS through aggregator module and connector modules. For example, the processor module 109 accesses the information stored at the SNS by using user credential(s) or permission given by the user. In a specific embodiment, depending on the social networks that the user signed up with, the processor module 109 may obtain information from one or more of the SNS. For example, if user has signed into an SNS, the processor module 109 can obtain from the SNS both information related to the user's contact and information of other users who are within a proximity of this user; if this user is not signed into the SNS, the processor module 109 can still obtain information of other users who are within a proximity of this user, but unable to obtain contacts of the user from the SNS. It is to be understood that access and information available is different from users 105 and user 106. For example, user 105 is registered with the processor module 109 and thus obtains information from the SNS through the processor module 109. As shown, if user 105 is a registered user of the SNS 102, the users may also access SNS 102 directly. In contrast, user 106 is not registered to the processor module 109, and the user 106 has no access to the processor module 109 and can only access the SNS 104 directly. For example, the user 105 is registered with the SNS 104, on which the user 106 is connected. The processor module 109 may obtain information related to both user 105 and the user 106 from the SNS 104.

The processor module 109 receives information from the SNS, at step 303. The processor module 109 processes the information and generates recommendations. For example, the recommendation is generated based on location and relevance of the information. More detailed description of this process is described below. In addition to generating recommendations using the information retrieved from the SNS, the processor module 109 also updates the social data warehouse with the information. The processor module 109 then sends the recommendation information to the user 105, at step 304. Depending on the application, other processes might be performed as well. For example, the processor module 109 may send an update to the merchant in response to the user request, thereby allowing the merchant to react.

Figure 3B:
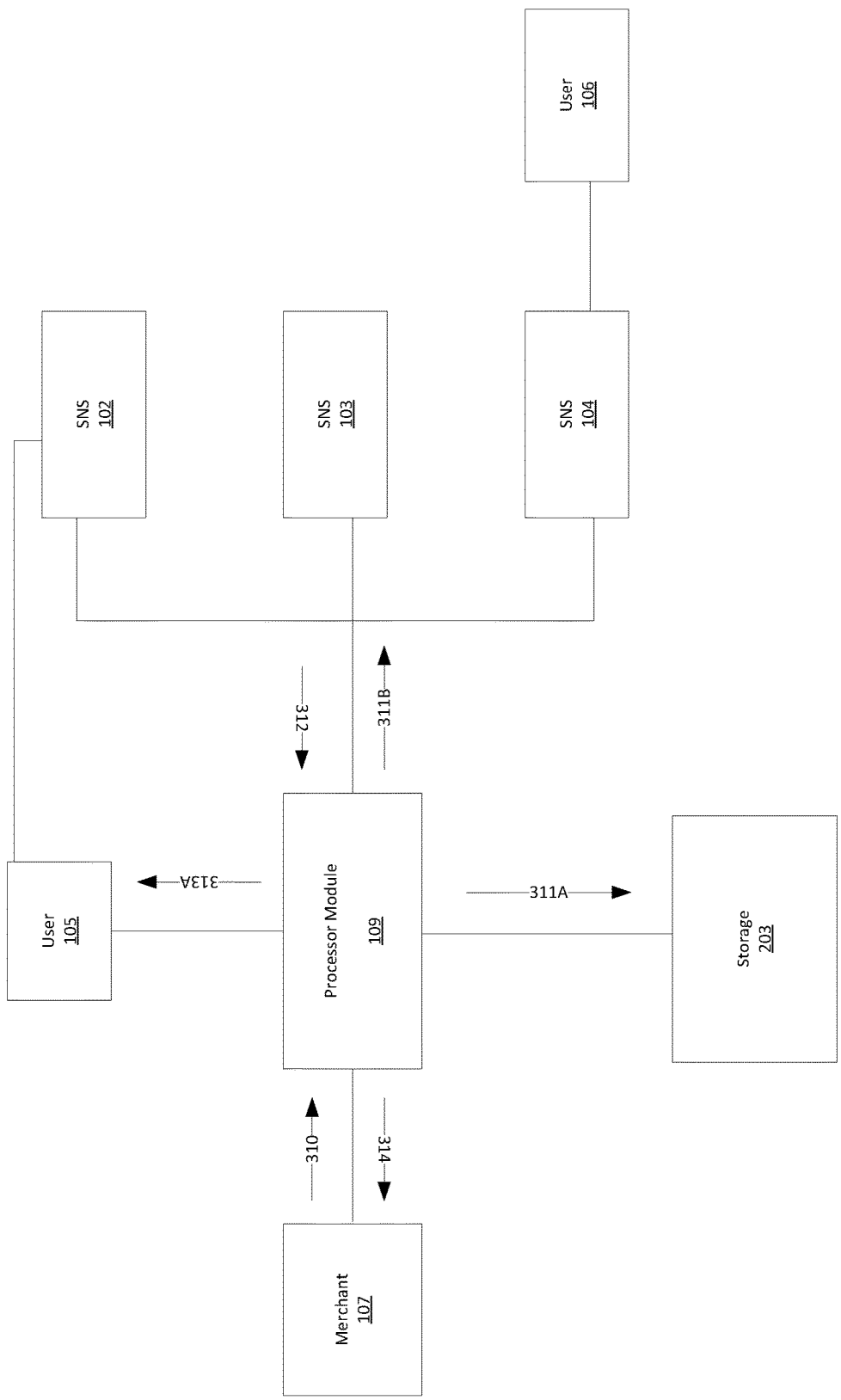
FIG. 3B is a simplified diagram illustrating a process for retrieving data according to embodiments of the present invention.

FIG. 3B is a simplified diagram illustrating a process for retrieving data according to embodiments of the present invention. This diagram is merely an example, which should not unduly limit the scope of the claims herein. One of ordinary skill in the art would recognize other variations, modifications, and alternatives. For example, FIG. 3B illustrates obtaining data in response to a merchant request, which can location update, user request, or other triggering mechanism. Various steps illustrated in FIG. 3B can be added, removed, modified, re-arranged, repeated, replaced, and/or overlapped.

At step 310, the merchant 107 sends a request for customer/user update to the aggregator module 101, which initiates a process for retrieving and/or processing data from data sources. In certain embodiments, the processor module 109 initiates the processing of updating information for the merchant 107. As explained above, the processor module 109 can be implement as an "AuraMesh" module described above. For example, the processor module 109 periodically sends update to the merchant 107. Once the processor module 109 initiates the process, it determines whether information needed for this process has been previously retrieved within a predetermined time period. For example, if information needed to serve the merchant 107 is stored at the storage 203 within a predetermined time period (e.g., 5 minutes, 10 minutes, or other predetermined time period), the processor module 109 obtain the information from the storage 203, at step 311A. In various embodiments, the information includes location/distance information. For example, a merchant, through the information, knows its distance from a user. On the other hand, if the information is not available at the storage 203, which can be unavailable or outdated according to the predetermined time period, the processor module 109 requests for the information from the SNS, at step 311B. Depending on the specific application, the processor module 109 may obtain information from one or more of the SNS through the aggregation connectors 108A-C.

The processor module 109 receives information from the SNS, at step 312. The processor module 109 processes the information. Using this information, the processor module 109 can generates recommendation for users and reports for merchant 107. For example, the processor module 109 generates user recommendation, which can be specifically related to the merchant 107, and sends the recommendation to users, at step 313A. The a processor module 109 generates reporting information and sends the information to the merchant 107, at step 314. Depending on the application, the merchant 107 may use the report information to generate user specific merchant information, such as coupons, merchandise information, and/or others.

It is to be appreciated that by using aggregated geo-tagged contents, the discovery service according to embodiments of the present invention allows consumer and end users to:
Find interesting people nearby (e.g., common interests or shared connections)
Interact with interesting people nearby, through chatting or commenting on their blogs
View check-ins and read comments on nearby POIs (e.g., restaurants, coffee shops)
Participate in events from nearby POIs
Redeem coupons from nearby businesses In addition, by using aggregated and/or geo-tagged contents, the discovery service according to embodiments of the present invention allows B&M businesses to:
Discover potential customers near its storefront
Interact with potential customers nearby, through any of the supported social networking services
Deliver marketing messages to these potential customers (e.g., coupons)

During the social aggregation process, geo-tagged contents are retrieved from various social network services, which can be major social networking services (SNS), around the given GPS coordinates. When there are a large number of users at the same location and these users request aggregation content within a predetermined time period (e.g., within 2 minutes), the same geo-tagged contents from SNS data sources are not retrieved repeatedly. It is to be appreciated that to avoid repetitive retrieval of the same content, these contents are stored in cache to avoid overloading on the SNS servers.

In various embodiments, a multiple-layer caching system is provided. The multiple-layer caching system is configured to serve millions of concurrent social users simultaneously. In various embodiments, the multi-layer caching mechanism employs the techniques of geo-hash, which allows geographical regions to be divided into rectangular grid. For example, a large grid can cover thousands of miles, whereas a small grid covers a few hundred yards. Each geo-hash has a unique global ID, and identifies a unique region in the world. In a specific embodiment, a multiple-layer caching system uses geo-hash as an identifier to storing geo-tagged data.

Furthermore, geo-hash can be used as keys for data partitioning. For example, the system can store the geo-hashes covering California in one database, and the geo-hashes covering New York in another database. This allows a data warehouse to scale vertically. As users and content increase, the system can divide data partitioning into smaller geo-hashes. For example, the state of California can be divided into geo-hashed and stored in multiple databases: geo-hash for San Francisco in one database and geo-hash for Log Angeles in another database.

Figure 4:
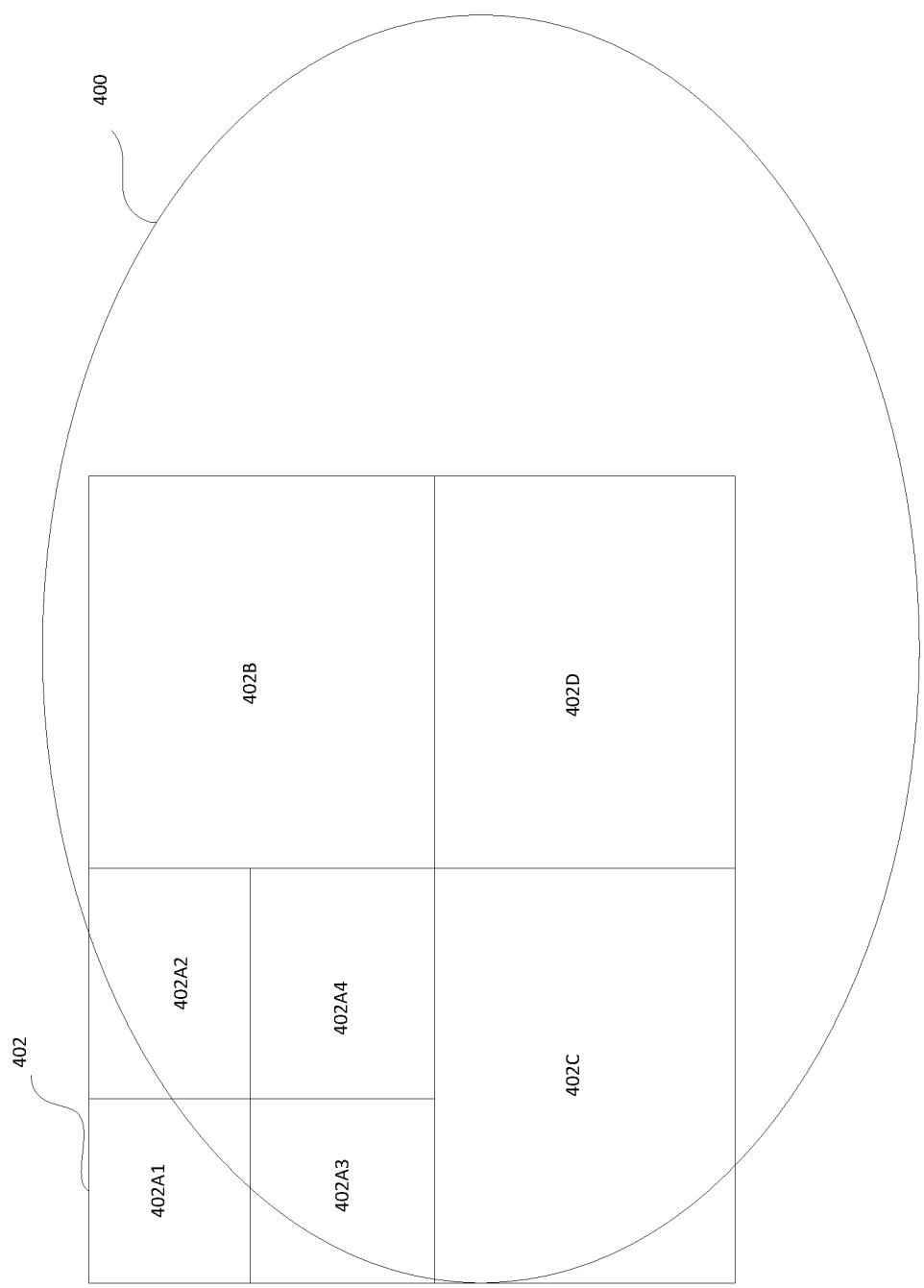
FIG. 4 is a simplified diagram illustrating data partitioning using geo-hash according to embodiments of the present invention.

FIG. 4 is a simplified exemplary diagram illustrating data partitioning using geo-hash according to embodiments of the present invention. This diagram is merely an example, which should not unduly limit the scope of the claims herein. One of ordinary skill in the art would recognize other variations, modifications, and alternatives. As shown in FIG. 4, a portion of the region 400 is represented by the hash 402. The mesh 402 is subdivided into 4 regions: 402A, 402B, 402C, and 402D. The region 402A itself is subdivided into 4 regions: 402A1, 402A2, 402A3, and 402A4. In various embodiments, data partition is based on the geo-hash hierarchy illustrated in FIG. 4. For example, a first data server is configured to store information for the region 401A, a second data server is configured to store information for the region 402B, and so on. The region 401A can be partitioned again (e.g., in case of high information density), and information for regions 402A1, 402A2, 402A3, and 402A4 can be stored at different storage modules. It is to be appreciated that storage, and the scaling and data allocation thereof, can structure based on the geo-hesh hierarchy. Depending on the application, other arrangements for storage are possible as well.

For performance, scalability, and availability, the AuraMesh social data warehouse employees multiple layers of storage and caching mechanisms. The layers are designed based on a combination of speed, storage capacity, and access frequency.

|  | Speed | Storage size | Access frequency |
|---|---|---|---|
| App server main memory | Fastest | Small | Most frequent |
| Memory cache (Redis) | Fast | Medium | Frequent |
| NOSQL database (MongoDB) | Slow | Large | Least frequent |
| Data warehouse | Slow (write-only) | Virtually unlimited | Analysis/reporting |

Content elements are stored in different layers depending on their persistency requirements, as well as whether they can be shared across different MyShine users. The following table illustrates some key content elements and their storage mechanism:

|  | Main memory | Memory cache | NOSQL DB | Data warehouse |
|---|---|---|---|---|
| MyShine user state | Session lifetime |  |  |  |
| User page set |  | Minutes |  |  |
| Nearby people list |  | Minutes | Days | Historical |
| People detail |  | Hours | Days | Historical |
| People activities |  | Hours | Days | Historical |
| Nearby POI list |  | Hours | Days | Historical |
| POI detail |  | Hours | Days | Historical |
| POI activities |  | Hours | Days | Historical |

The app server's main memory is the fastest and most precious. The most frequently used content items, such as My Shine user's state information, are stored at the app server. Memory cache is fast and it can be used to store frequently changed content, which can be, for example, a list of social users nearby. Since people move around often, this list is highly dynamic so the cache duration typically lasts only several minutes. Persistent data elements, on the other hand, are stored in the NOSQL database. Historical data is stored in the social data warehouse, which is only used for analysis and reporting, not for runtime data retrieval.

It is to be appreciated that multi-layer storage caching structure provides various advantages, which include:
  Improving performance and scalability of our services
  Reducing the number of requests to the social networks. Most, if not all, social networks impose limit on the number of incoming requests (to conserve their resources). The caching algorithms ensure that when multiple MyShine users request data from the same social network within a given duration (e.g., 10-minute window), only a single request is sent to that social network.

The social data warehouse, AuraMesh, contains data analysis algorithms aimed for computing social relevance. Depending on the application, relevance refers to:
  The relationship between two social users in the same vicinity, and whether we should recommend them to each other as potential friends so that they can meet up.
  The relevance between a social user and a merchant in the same vicinity, and whether we should recommend them to each other.

In various embodiments, an analytical framework according to embodiments of the present invention leverages the following elements to compute the "relevance":

Data sources, which includes major social networks and other source such as. Data sources are extensible, as new sources can be added by implementing connectors.

Relevance factors, which includes, for example, location, time, interests, age/gender, and/or others. The factors are used to compute the relevance between two users (or a merchant and a user). Depending on the application, other factors can be added. Typically, more factors make relevance computation more accurate.

Factor weight, which assigns a weight to a factor. This indicates the importance of the factor. Factor weights can be dynamically configured and typically differ by industry.

AuraMesh computes the relevance score by analyzing data from different data sources and the compute the total score by adding up the weight in each relevance factor. For example, assuming when computing the relevance score between Joe and Jane, there are two matching factors:
  They share two friends, Eddie and Mary
  They share the same interest, "tennis"

Now, assuming the weight for the friend factor is 10 and the weight for the interest factor is 5, then the relevance score is $10 \times 2 + 5 = 25$.

A recommendation threshold score can be configured to indicate whether they should be recommended to each other. In this case, if the threshold score is less than or equal to 25, Joe and Jane will receive recommendations with descriptions of the matching factors.

An important aspect in computing the relevance score is the factor weights. Factor weights can be predetermined and/or configured dynamically (system-wide or per-user basis), thereby satisfying requirements from different users and businesses in a variety of industries.

In addition, analysis algorithms can also automatically adjust factor weights with a feedback loop mechanism. For example, when a user does not think the recommended content is relevant or interesting, she may
  reject a recommendation with an indication of the offending factors that caused this rejection. In this case AuraMesh will automatically reduce the weights of those factors for this user.
  ignore the recommendation without indicating the offending factors. In this case
AuraMesh will reduce the weight of the most significant factor contributing to this recommendation.

In various embodiments, a social recommendation engine alerts a social user when interesting people or events occur near the user's current location. Recommendation may be send to one or both parties, based on the definition of their recommendation threshold scores, respectively.

As an example, the following recommendation factors can be used in deciding whether to alert the user that another social user of interest is nearby:
  User A and user B are direct friends. When A and B are in the same vicinity, both may receive alerts that the other party is nearby.
  User A follows user B. When A and B are in the same vicinity, A may receive an alert that B is nearby.
  A and B having common interests. When A and B are in the same vicinity, both may receive alerts that the other party is nearby.
  A and B follows the same person(s), both may receive alerts that the other party is nearby.
  A and B share the same friend(s). When A and B are in the same vicinity, both may receive alerts that the other party is nearby.

A and B share favorite POIs. When A and B are in the same vicinity, both may receive alerts that the other party is nearby.

A and B frequent the same POIs. When A and B are in the same vicinity, both may receive alerts that the other party is nearby.

Depending on the application, additional factors may be easily added into the overall computation. For example, these factors can be home town, birthday, colleges, and/or others. For example, the total social relevance score is computed by summing up the weight of each factor multiplied by the appropriate multiplicity (e.g., x2 because two shared friends). When the computed social relevance score is equal to or above the recommendation threshold (system-wide default or user-specified), an alert will be sent to the user.

Finally, alerts for social recommendations are implemented as non-intrusive push notifications. It is to be appreciated that a user's privacy concern is fully observed. For example, user A may turn off push notifications completely, and user B may choose not to expose her location at all.

According to embodiments of the present invention, an analytical framework computes the relevance scores between merchants and consumers. Among other things, the goal is to find suitable matches between merchants and consumers so that merchants may deliver targeted messages to consumers (e.g., coupons and promotions).

As an example, the following recommendation factors can be used in deciding whether to recommend a consumer to the merchant as a potential customer:
   Location: how far is the consumer away from the merchant's store front
   Occurrence: how many times has the consumer appeared nearby
   POI interactions (check-ins) nearby
   Influences: the number of friends and followers (i.e., the consumer's viral power)
   Mobile purchasing/coupon redemptions
   User's interests (public tags)
   User's interests (content analysis)

Additional factors may be easily added into the overall computation. For example, these factors can be a consumer's age, sex, education, and/or other demographic data. The total relevance score can be computed by summing up the weight of each factor multiplied by the appropriate multiplicity. When the computed relevance score is equal to or above the recommendation threshold (system-wide default or merchant-specified), the consumer will be recommended to the merchant.

By aggregating rich geo-tagged social data from multiple social networks, AuraMesh analyzes demographic, contextual, and behavioral consumer data to discover and recommend potential customers to merchants.

Once the potential customers are identified, the merchant may engage in behaviorally-targeted advertising, with one-to-one messages to consumers at the exact time and place. As an example, for a bakery, marketing messages can be delivered in the following fashion:
   Content: 40% discount
   Delivery time: 4 pm everyday
   Distance: within 500 meters of the storefront
   Audience size/number of messages: 200

This will deliver a 40% coupon message to the top 200 people within 500 meters of the storefront, at 4 PM everyday (when the bakery needs to empty its current-day stock). For best user experience, MyShine can provide consumer privacy settings to prevent flooding of ads:

Membership merchants. The user may be customers or members of one or more merchants, and she wishes to receive messages from these merchants only.

Favorite merchants. The user may indicate interests in one or more merchants (e.g., specific brands), and she wishes to receive messages from these merchants only.

All merchants. The user is open to messages from any merchants, with an upper bound on the amount of messages per merchant and total amount of messages per day.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for providing information to one or more users, the method comprising:
   storing, within local memory, user profiles for a plurality of users using one or more computer readable medium, the plurality of user profiles comprising a first user profile for a first user, the plurality of user profiles further comprising information related to a plurality of social networks;
   receiving a location update from the first user, wherein the location update is associated with a first time;
   processing the location update;
   identifying, within the local memory, information of interest related to the location update from the first user, wherein the information of interest comprises a respective location for each of the plurality of users and points of interest associated with the plurality of users, wherein the local memory stores at least part of the information of interest across two or more distinct partitions of the local memory based on geo-location hashing;
   identifying a second time associated with the respective location for at least one of the plurality of users, the second time indicating a time when the respective location for the at least one of the plurality of users was stored in the local memory;
   identifying a third time associated with the points of interest associated with the at least one of the plurality of users, the third time indicating a time when the points of interest associated with the at least one of the plurality of users was stored in the local memory;
   comparing the first time and the second time to a first predetermined time period to determine a difference between the first time and the second time exceeds the first predetermined time period;
   in response to the difference between the first time and the second time exceeding the first predetermined time period, requesting the respective location for each of the plurality of users from one or more social network services (SNS);
   comparing the first time and the third time to a second predetermined time period to determine a difference between the first time and the third time exceeds the second predetermined time period, wherein the second predetermined time period is longer than the first predetermined time period;
   in response to the difference between the first time and the third time exceeding the second predetermined time period, requesting the points of interest associated with the plurality of users from the one or more SNS;

receiving the information of interest from the one or more SNS;

updating, based at least in part on the geo-location hashing, the two or more distinct partitions of the local memory with the information of interest received from the one or more SNS;

organizing the information of interest within the two or more distinct partitions of the local memory, according to a geo-hash hierarchy;

processing the information of interest based on the location update and user relationship information related to the first user, wherein the user relationship information indicates a relationship between another one of plurality users and the first user, wherein the another one of the plurality of users and the first users are associated with different SNS;

determining a relevance value associated with user information regarding the first user, wherein the relevance value is between the first user and a merchant in a same vicinity based on one or more factors including location and time, and wherein the one or more factors is dynamically configured;

generating recommendations for the first user based on the relevance value and processing result of the information of interest; and sending the recommendations to the first user.

2. The method of claim 1, wherein the local memory comprises cache memory.

3. The method of claim 1, further comprising storing the information of interest in cache memory within the local memory.

4. The method of claim 1, wherein the one or more social network services comprise at least one of a Facebook server, a Google+ server, a Foursquare server, or a Twitter server.

5. The method of claim 1, wherein the recommendations include merchant information.

6. The method of claim 1, further comprising:
determining the relevance value associated with the information of interest; and
comparing the relevance value to a predetermined threshold value.

7. The method of claim 1, further comprising receiving a user request for recommendations.

8. A non-transitory computer-readable storage medium having stored thereon instructions, the instructions comprising:

storing, within local memory, user profiles for a plurality of users using one or more computer readable medium, the plurality of user profiles comprising a first user profile for a first user, the plurality of user profiles further comprising information related to a plurality of social networks;

receiving a location update from the first user, wherein the location update is associated with a first time;

processing the location update;

identifying, within the local memory, information of interest related to the location update from the first user, wherein the information of interest comprises a respective location for each of the plurality of users and points of interest associated with the plurality of users, wherein the local memory stores at least part of the information of interest across two or more distinct partitions of the local memory based on geo-location hashing;

identifying a second time associated with the respective location for at least one of the plurality of users, the second time indicating a time when the respective location for the at least one of the plurality of users was stored in the local memory;

identifying a third time associated with the points of interest associated with the at least one of the plurality of users, the third time indicating a time when the points of interest associated with the at least one of the plurality of users was stored in the local memory;

comparing the first time and the second time to a first predetermined time period to determine a difference between the first time and the second time exceeds the first predetermined time period;

in response to the difference between the first time and the second time exceeding the first predetermined time period, requesting the respective location for each of the plurality of users from one or more social network services (SNS);

comparing the first time and the third time to a second predetermined time period to determine a difference between the first time and the third time exceeds the second predetermined time period, wherein the second predetermined time period is longer than the first predetermined time period;

in response to the difference between the first time and the third time exceeding the second predetermined time period, requesting the points of interest associated with the plurality of users from the one or more SNS;

receiving the information of interest from the one or more SNS;

updating, based at least in part on the geo-location hashing, the two or more distinct partitions of the local memory with the information of interest received from the one or more SNS;

organizing the information of interest within the two or more distinct partitions of the local memory, according to a geo-hash hierarchy;

processing the information of interest based on the location update and user relationship information related to the first user, wherein the user relationship information indicates a relationship between another one of plurality users and the first user, wherein the another one of the plurality of users and the first users are associated with different SNS;

determining a relevance value associated with user information regarding the first user, wherein the relevance value is between the first user and a merchant in a same vicinity based on one or more factors including location and time, and wherein the one or more factors is dynamically configured;

generating recommendations for the first user based on the relevance value and processing result of the information of interest; and sending the recommendations to the first user.

9. The non-transitory computer-readable storage medium of claim 8, wherein the local memory comprises cache memory.

10. The non-transitory computer-readable storage medium of claim 8, the instructions further comprising storing the information of interest in cache memory within the local memory.

11. The non-transitory computer-readable storage medium of claim 8, wherein the one or more social network services comprise at least one of a Facebook server, a Google+ server, a Foursquare server, or a Twitter server.

12. The non-transitory computer-readable storage medium of claim 8, wherein the recommendations include merchant information.

13. The non-transitory computer-readable storage medium of claim 8, further comprising:
   determining the relevance value associated with the information of interest; and
   comparing the relevance value to a predetermined threshold value.

14. The non-transitory computer-readable storage medium of claim 8, further comprising receiving a user request for recommendations.

15. A system comprising:
   one or more processors; and
   a memory coupled with the one or more processors, the memory configured to store instructions that when executed by the one or more processors cause the one or more processors to:
   store, within local memory, user profiles for a plurality of users using one or more computer readable medium, the plurality of user profiles comprising a first user profile for a first user, the plurality of user profiles further comprising information related to a plurality of social networks;
   receive a location update from the first user, wherein the location update is associated with a first time;
   process the location update;
   identify, within the local memory, information of interest related to the location update from the first user, wherein the information of interest comprises a respective location for each of the plurality of users and points of interest associated with the plurality of users, wherein the local memory stores at least part of the information of interest across two or more distinct partitions of the local memory based on geo-location hashing;
   identify a second time associated with the respective location for at least one of the plurality of users, the second time indicating a time when the respective location for the at least one of the plurality of users was stored in the local memory;
   identify a third time associated with the points of interest associated with the at least one of the plurality of users, the third time indicating a time when the points of interest associated with the at least one of the plurality of users was stored in the local memory;
   compare the first time and the second time to a first predetermined time period to determine a difference between the first time and the second time exceeds the first predetermined time period;
   in response to the difference between the first time and the second time exceeding the first predetermined time period, request the respective location for each of the plurality of users from one or more social network services (SNS);
   compare the first time and the third time to a second predetermined time period to determine a difference between the first time and the third time exceeds the second predetermined time period, wherein the second predetermined time period is longer than the first predetermined time period;
   in response to the difference between the first time and the third time exceeding the second predetermined time period, request the points of interest associated with the plurality of users from the one or more SNS;
   receive the information of interest from the one or more SNS;
   update, based at least in part on the geo-location hashing, the two or more distinct partitions of the local memory with the information of interest received from the one or more SNS;
   organize the information of interest within the two or more distinct partitions of the local memory, according to a geo-hash hierarchy;
   process the information of interest based on the location update and user relationship information related to the first user, wherein the user relationship information indicates a relationship between another one of plurality users and the first user, wherein the another one of the plurality of users and the first users are associated with different SNS;
   determine a relevance value associated with user information regarding the first user, wherein the relevance value is between the first user and a merchant in a same vicinity based on one or more factors including location and time, and wherein the one or more factors is dynamically configured;
   generate recommendations for the first user based on the relevance value and processing result of the information of interest; and
   send the recommendations to the first user.

* * * * *